US011321926B2

(12) United States Patent
Nagaraja

(10) Patent No.: US 11,321,926 B2
(45) Date of Patent: May 3, 2022

(54) METHOD AND DEVICE FOR CONTENT PLACEMENT

(71) Applicant: Apple Inc., Cupertino, CA (US)

(72) Inventor: Seshadri Nagaraja, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/953,591

(22) Filed: Nov. 20, 2020

(65) Prior Publication Data

US 2021/0192847 A1 Jun. 24, 2021

Related U.S. Application Data

(60) Provisional application No. 62/949,944, filed on Dec. 18, 2019.

(51) Int. Cl.
*G06T 19/00* (2011.01)
*G06T 19/20* (2011.01)

(52) U.S. Cl.
CPC ............ *G06T 19/006* (2013.01); *G06T 19/20* (2013.01)

(58) Field of Classification Search
None
See application file for complete search history.

(56) References Cited

U.S. PATENT DOCUMENTS

| | | | |
|---|---|---|---|
| 8,884,988 B1* | 11/2014 | Cho ...................... | G06T 19/006 345/633 |
| 2015/0221133 A1* | 8/2015 | Groten .................... | G06T 11/00 345/633 |
| 2016/0371890 A1* | 12/2016 | Raichelgauz ........... | G06F 3/048 |
| 2017/0323488 A1* | 11/2017 | Mott ....................... | G06T 19/006 |
| 2018/0276899 A1* | 9/2018 | Liao ........................ | G06T 19/00 |
| 2019/0026936 A1* | 1/2019 | Gorur Sheshagiri ....................... | G06F 3/0304 |

* cited by examiner

*Primary Examiner* — Robert J Craddock
(74) *Attorney, Agent, or Firm* — Fernando & Partners, LLP

(57) ABSTRACT

In some implementations, a method includes: obtaining a representation an environment; determining a plurality of candidate content placement locations within the environment based on the representation of the environment; determining characterization parameters for the plurality of candidate content placement locations; obtaining extended reality (XR) content selected based on a match between content parameters associated with the XR content and characterization parameters for a respective candidate content placement location among the plurality of candidate content placement locations; and displaying, via the display device, the XR content at the respective candidate content placement location within the environment.

26 Claims, 12 Drawing Sheets

METHOD AND DEVICE FOR CONTENT PLACEMENT

CROSS-REFERENCE TO RELATED APPLICATIONS

This application claims the benefit of U.S. Provisional Patent App. No. 62/949,944, filed on Dec. 18, 2019, which is incorporated by reference in its entirety.

TECHNICAL FIELD

The present disclosure generally relates to content placement, and in particular, to systems, methods, and devices for content placement in a virtual or extended reality (XR) environment.

BACKGROUND

In some instances, typical content placement in video games or other media is both static and manually placed by the media creator. By contrast, according to some implementations, a virtual environment or an XR environment is parsed for candidate content placement locations. Furthermore, characterization parameters (e.g., contextual metadata) for those candidate content placement locations are determined in order to make a more informed decision when placing XR content thereon.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
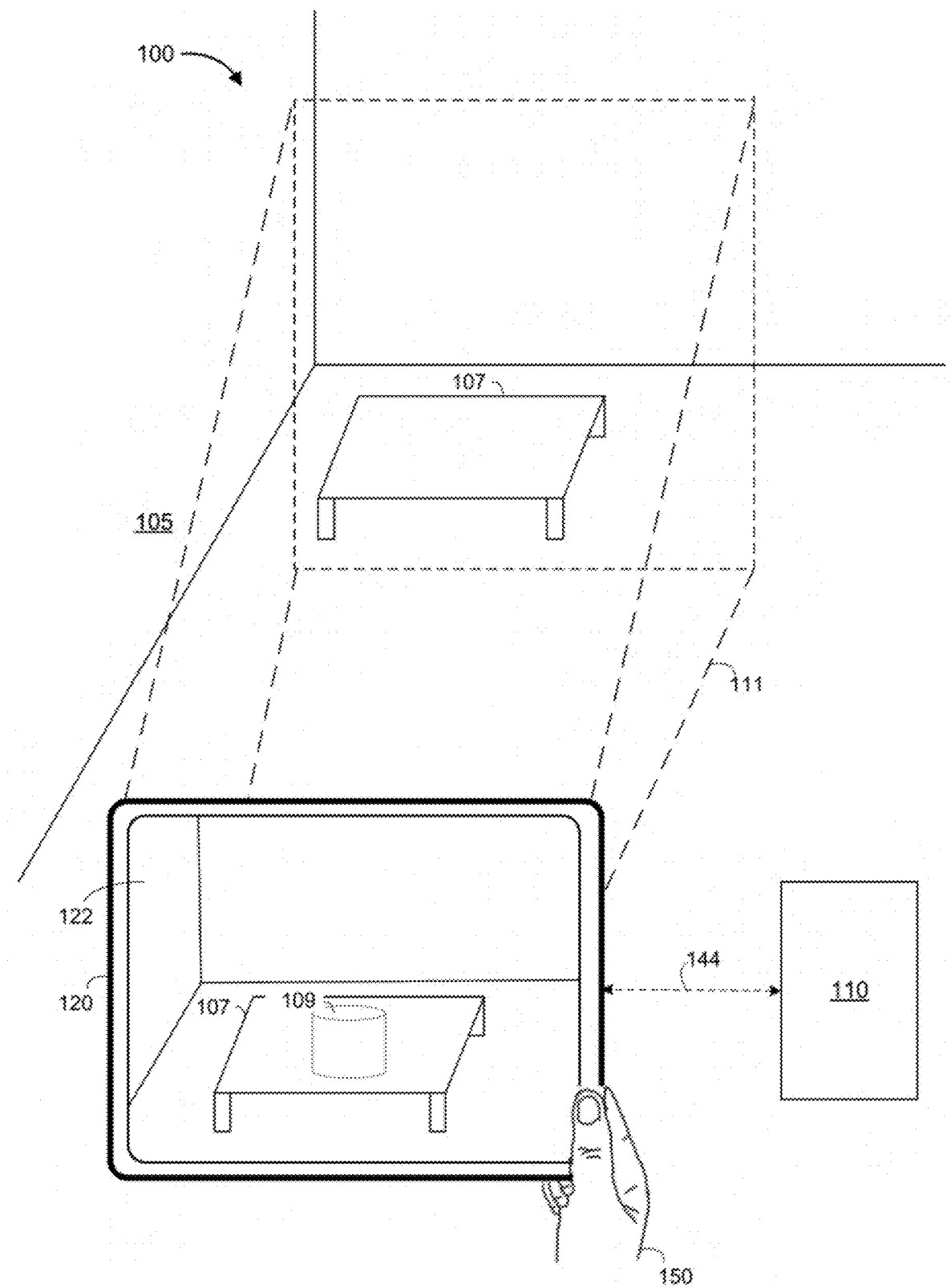
FIG. 1 is a block diagram of an example operating architecture in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

SUMMARY

Various implementations disclosed herein include devices, systems, and methods for "smart" content placement. According to some implementations, the method is performed at a computing system including non-transitory memory and one or more processors, wherein the computing system is communicatively coupled to a display device and one or more input devices. The method includes: obtaining a representation an environment (sometimes also referred to as a "XR environment" or a "graphical environment"); determining a plurality of candidate content placement locations within the environment based on the representation of the environment; determining characterization parameters for the plurality of candidate content placement locations; obtaining extended reality (XR) content selected based on a match between content parameters associated with the XR content and characterization parameters for a respective candidate content placement location among the plurality of candidate content placement locations; and displaying, via the display device, the XR content at the respective candidate content placement location within the environment.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

In accordance with some implementations, a computing system includes one or more processors, non-transitory memory, an interface for communicating with a display device and one or more input devices, and one or more programs; the one or more programs are stored in the non-transitory memory and configured to be executed by the one or more processors and the one or more programs include instructions for performing or causing performance of the operations of any of the methods described herein. In accordance with some implementations, a non-transitory computer readable storage medium has stored therein instructions which when executed by one or more processors of a computing system with an interface for communicating with a display device and one or more input devices, cause the computing system to perform or cause performance of the operations of any of the methods described herein. In accordance with some implementations, a computing system includes one or more processors, non-transitory memory, an interface for communicating with a display device and one or more input devices, and means for performing or causing performance of the operations of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, an extended reality (XR) environment refers to a wholly or partially simulated environment that people sense and/or interact with via an electronic system. In XR, a subset of a person's physical motions, or representations thereof, are tracked, and, in response, one or more characteristics of one or more XR objects simulated in the XR environment are adjusted in a manner that comports with at least one law of physics. For example, an XR system may detect a person's head turning and, in response, adjust graphical content and an acoustic field presented to the person in a manner similar to how such views and sounds would change in a physical environment. In some situations (e.g., for accessibility reasons), adjustments to characteristic(s) of XR object(s) in an XR environment may be made in response to representations of physical motions (e.g., vocal commands).

A person may sense and/or interact with an XR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some XR environments, a person may sense and/or interact only with audio objects.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real-world objects (that is, physical articles from the physical environment or representations thereof). For example, a system may account for movements so that a virtual tree appears stationery with respect to the physical ground.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the Sun or another light source in the physical environment.

There are many different types of electronic systems that enable a person to sense and/or interact with various XR environments. Examples include near-eye systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A near-eye system may have one or more speaker(s) and an integrated opaque display. Alternatively, a near-eye system may be configured to accept an external opaque display (e.g., a smartphone). The near-eye system may incorporate one or more imaging sensors to capture images or video of the physical environment, and/or one or more microphones to capture audio of the physical environment. Rather than an opaque display, a near-eye system may have a transparent or translucent display. The display may utilize digital light projection, micro-electromechanical systems (MEMS), digital micromirror devices (DMDs), organic light-emitting diodes (OLEDs), light-emitting diodes (LEDs), micro-light-emitting diodes (μLEDs), liquid crystal on silicon (LCoS), laser scanning light source, or any combination of these technologies. The medium may be an optical waveguide, a hologram medium, an optical combiner, an optical reflector, or any combination thereof. In one implementation, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

FIG. 1 is a block diagram of an example operating architecture 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating architecture 100 includes an optional controller 110 and an electronic device 120 (e.g., a tablet, mobile phone, laptop, near-eye system, wearable computing device, or the like).

In some implementations, the controller 110 is configured to manage and coordinate an XR experience (sometimes also referred to herein as a "XR environment" or a "virtual environment" or a "graphical environment") for a user 150 and zero or more other users. In some implementations, the controller 110 includes a suitable combination of software, firmware, and/or hardware. The controller 110 is described in greater detail below with respect to FIG. 2. In some implementations, the controller 110 is a computing device that is local or remote relative to the physical environment 105. For example, the controller 110 is a local server located within the physical environment 105. In another example, the controller 110 is a remote server located outside of the physical environment 105 (e.g., a cloud server, central server, etc.). In some implementations, the controller 110 is communicatively coupled with the electronic device 120 via one or more wired or wireless communication channels 144 (e.g., BLUETOOTH, IEEE 802.11x, IEEE 802.16x, IEEE 802.3x, etc.). In some implementations, the functions of the controller 110 are provided by the electronic device 120. As such, in some implementations, the components of the controller 110 are integrated into the electronic device 120.

In some implementations, the electronic device 120 is configured to present audio and/or video (A/V) content to the user 150. In some implementations, the electronic device 120 is configured to present a user interface (UI) and/or an XR environment 128 to the user 150. In some implementations, the electronic device 120 includes a suitable combination of software, firmware, and/or hardware. The electronic device 120 is described in greater detail below with respect to FIG. 3.

According to some implementations, the electronic device 120 presents an XR experience to the user 150 while the user 150 is physically present within a physical environment 105 that includes a table 107 within the field-of-view (FOV) 111 of the electronic device 120. As such, in some implementations, the user 150 holds the electronic device 120 in his/her hand(s). In some implementations, while presenting the XR experience, the electronic device 120 is configured to present XR content (sometimes also referred to herein as "graphical content" or "virtual content"), including an XR cylinder 109, and to enable video pass-through of the physical environment 105 (e.g., including the table 107) on a display 122. For example, the electronic device 120 corresponds to a near-eye system, mobile phone, tablet, laptop, wearable computing device, or the like.

In some implementations, the display 122 corresponds to an additive display that enables optical see-through of the physical environment 105 including the table 107. For example, the display 122 correspond to a transparent lens, and the electronic device 120 corresponds to a pair of glasses worn by the user 150. As such, in some implementations, the electronic device 120 presents a user interface by projecting the XR content (e.g., the XR cylinder 109) onto the additive display, which is, in turn, overlaid on the physical environment 105 from the perspective of the user 150. In some implementations, the electronic device 120 presents the user interface by displaying the XR content (e.g., the XR cylinder 109) on the additive display, which is, in turn, overlaid on the physical environment 105 from the perspective of the user 150.

In some implementations, the user 150 wears the electronic device 120 such as a near-eye system. As such, the electronic device 120 includes one or more displays provided to display the XR content (e.g., a single display or one for each eye). For example, the electronic device 120 encloses the FOV of the user 150. In such implementations, the electronic device 120 presents the XR environment 128 by displaying data corresponding to the XR environment 128 on the one or more displays or by projecting data corresponding to the XR environment 128 onto the retinas of the user 150.

In some implementations, the electronic device 120 includes an integrated display (e.g., a built-in display) that displays the XR environment 128. In some implementations, the electronic device 120 includes a head-mountable enclosure. In various implementations, the head-mountable enclosure includes an attachment region to which another device with a display can be attached. For example, in some implementations, the electronic device 120 can be attached to the head-mountable enclosure. In various implementations, the head-mountable enclosure is shaped to form a receptacle for receiving another device that includes a display (e.g., the electronic device 120). For example, in some implementations, the electronic device 120 slides/snaps into or otherwise attaches to the head-mountable enclosure. In some implementations, the display of the device attached to the head-mountable enclosure presents (e.g., displays) the XR environment 128. In some implementations, the electronic device 120 is replaced with an XR chamber, enclosure, or room configured to present XR content in which the user 150 does not wear the electronic device 120.

In some implementations, the controller 110 and/or the electronic device 120 cause an XR representation of the user 150 to move within the XR environment 128 based on movement information (e.g., body pose data, eye tracking data, hand/limb/finger/extremity tracking data, etc.) from the electronic device 120 and/or optional remote input devices within the physical environment 105. In some implementations, the optional remote input devices correspond to fixed or movable sensory equipment within the physical environment 105 (e.g., image sensors, depth sensors, infrared (IR) sensors, event cameras, microphones, etc.). In some implementations, each of the remote input devices is configured to collect/capture input data and provide the input data to the controller 110 and/or the electronic device 120 while the user 150 is physically within the physical environment 105. In some implementations, the remote input devices include microphones, and the input data includes audio data associated with the user 150 (e.g., speech samples). In some implementations, the remote input devices include image sensors (e.g., cameras), and the input data includes images of the user 150. In some implementations, the input data characterizes body poses of the user 150 at different times. In some implementations, the input data characterizes head poses of the user 150 at different times. In some implementations, the input data characterizes hand tracking information associated with the hands of the user 150 at different times. In some implementations, the input data characterizes the velocity and/or acceleration of body parts of the user 150 such as his/her hands. In some implementations, the input data indicates joint positions and/or joint orientations of the user 150. In some implementations, the remote input devices include feedback devices such as speakers, lights, or the like.

Figure 2:
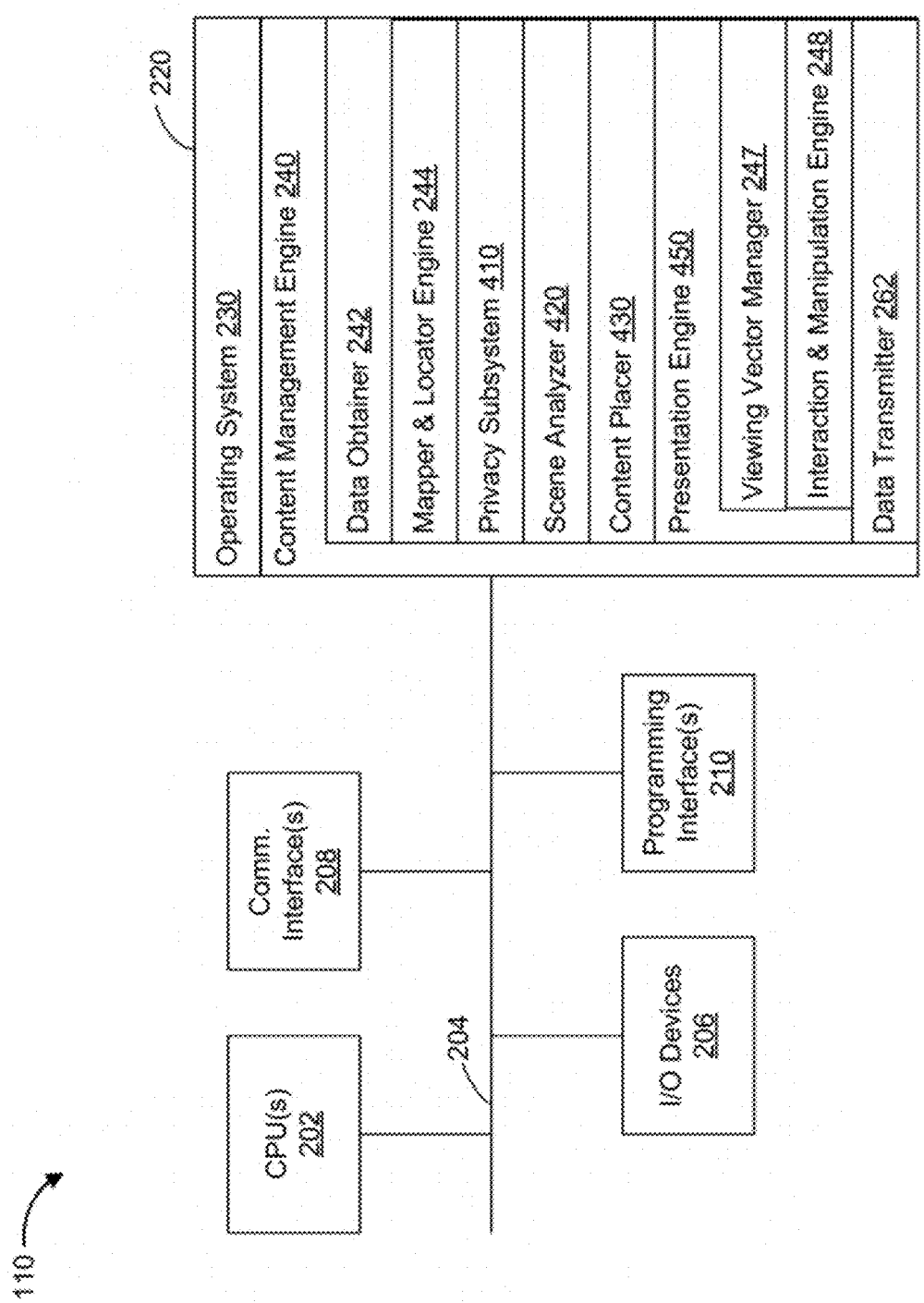
FIG. 2 is a block diagram of an example controller in accordance with some implementations.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230 and a content management engine 240.

The operating system 230 includes procedures for handling various basic system services and for performing hardware dependent tasks.

In some implementations, the content management engine 240 is configured to manage and coordinate one or more XR experiences (sometimes also referred to herein as "XR environments") for one or more users (e.g., a single XR experience for one or more users, or multiple XR experiences for respective groups of one or more users). To that end, in various implementations, the content management engine 240 includes a data obtainer 242, a mapper and locator engine 244, a privacy subsystem 410, a scene analyzer 420, a content placer 430, a presentation engine 450, and a data transmitter 262.

In some implementations, the data obtainer 242 is configured to obtain data (e.g., presentation data, input data, image frames, user interaction data, head tracking information, camera pose tracking information, eye tracking information, hand/limb tracking information, depth information, sensor data, location data, etc.) from at least one of the I/O devices 206 of the controller 110, the electronic device 120, and the optional remote input devices 170A and 170B. To that end, in various implementations, the data obtainer 242 includes instructions and/or logic therefor, and heuristics and metadata therefor.

In some implementations, the mapper and locator engine 244 is configured to map the physical environment 105 and to track the position/location of at least the electronic device 120 with respect to the physical environment 105. To that end, in various implementations, the mapper and locator engine 244 includes instructions and/or logic therefor, and heuristics and metadata therefor.

Figure 4:
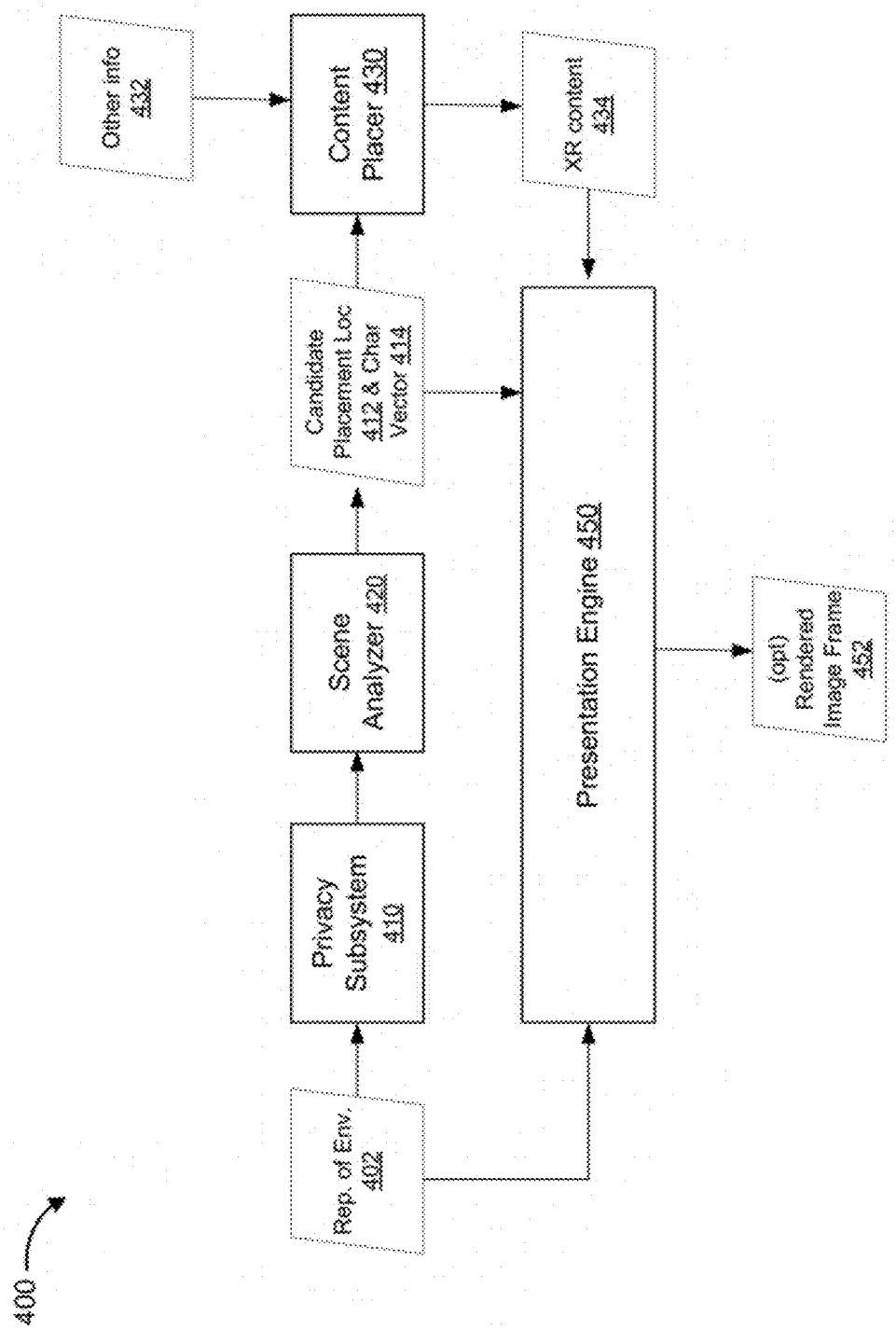
FIG. 4 is a block diagram of an example data processing architecture in accordance with some implementations.

In some implementations, the privacy subsystem 410 is configured to remove, obscure, anonymize, or otherwise protect user information and/or identifying information (e.g., at least some portion of the representation of the environment in FIG. 4) based on one or more privacy filters. The privacy subsystem 410 is described in more detail below with reference to FIG. 4. To that end, in various implementations, the privacy subsystem 410 includes instructions and/or logic therefor, and heuristics and metadata therefor.

In some implementations, the scene analyzer 420 is configured to process the representation of the environment (e.g., one or more image frames of the physical environment 105 captured by an exterior-facing image sensor, or a 3D mesh of the XR environment). In some implementations, the scene analyzer 420 determines a plurality of candidate content placement locations within the physical environment that satisfy a content placement criterion. In some implementations, the scene analyzer 420 also determines a characterization vector for each of the plurality of candidate content placement locations includes a plurality of characterization parameters. The scene analyzer 420 is described in more detail below with reference to FIG. 4. Furthermore, the characterization vector is described in more detail below with reference to FIG. 7. To that end, in various implementations, the scene analyzer 420 includes instructions and/or logic therefor, and heuristics and metadata therefor.

In some implementations, the content placer 430 configured to select XR content for a respective candidate content placement location among the plurality of candidate content placement locations. The content placer 430 is described in more detail below with reference to FIG. 4. To that end, in various implementations, the content placer 430 includes instructions and/or logic therefor, and heuristics and metadata therefor.

In some implementations, the presentation engine 450 is configured to generate (i.e., render), manage, and modify content and/or an XR environment presented to a user. To that end, in various implementations, the presentation engine 450 includes instructions and/or logic therefor, and heuristics and metadata therefor. To that end, in some implementations, the presentation engine 450 includes a viewing vector manager 247 and an interaction and manipulation engine 248.

In some implementations, the viewing vector manager 247 is configured to obtain (e.g., receive, retrieve, or generate) and update a viewing vector based on body pose tracking information, head tracking information, camera pose tracking information, eye tracking information, hand/limb tracking information, intrinsic camera parameters, and/or the like from the electronic device 120 and/or associated with a user 150 of the electronic device 120. The viewing vector is described in more detail below with reference to FIG. 7. To that end, in various implementations, the viewing vector manager 247 includes instructions and/or logic therefor, and heuristics and metadata therefor.

In some implementations, the interaction and manipulation engine 248 is configured to interpret user interactions and/or modification inputs directed to the content and/or the XR environment. In some implementations, the interaction and manipulation engine 248 also is configured to update the XR environment when the viewing vector changes (e.g., due to translational and/or rotational movement of the electronic device 120). To that end, in various implementations, the interaction and manipulation engine 248 includes instructions and/or logic therefor, and heuristics and metadata therefor.

In some implementations, the data transmitter 262 is configured to transmit data (e.g., presentation data such as rendered image frames associated with the XR environment, location data, etc.) to at least the electronic device 120. To that end, in various implementations, the data transmitter 262 includes instructions and/or logic therefor, and heuristics and metadata therefor.

Although the data obtainer 242, the mapper and locator engine 244, the privacy subsystem 410, the scene analyzer 420, the content placer 430, a presentation engine 450, and the data transmitter 262 are shown as residing on a single device (e.g., the controller 110), it should be understood that in other implementations, any combination of the data obtainer 242, the mapper and locator engine 244, the privacy subsystem 410, the scene analyzer 420, the content placer 430, a presentation engine 450, and the data transmitter 262 may be located in separate computing devices.

In some implementations, the functions and/or components of the controller 110 are combined with or provided by the electronic device 120 shown below in FIG. 3. Moreover, FIG. 2 is intended more as a functional description of the various features which be present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 3:
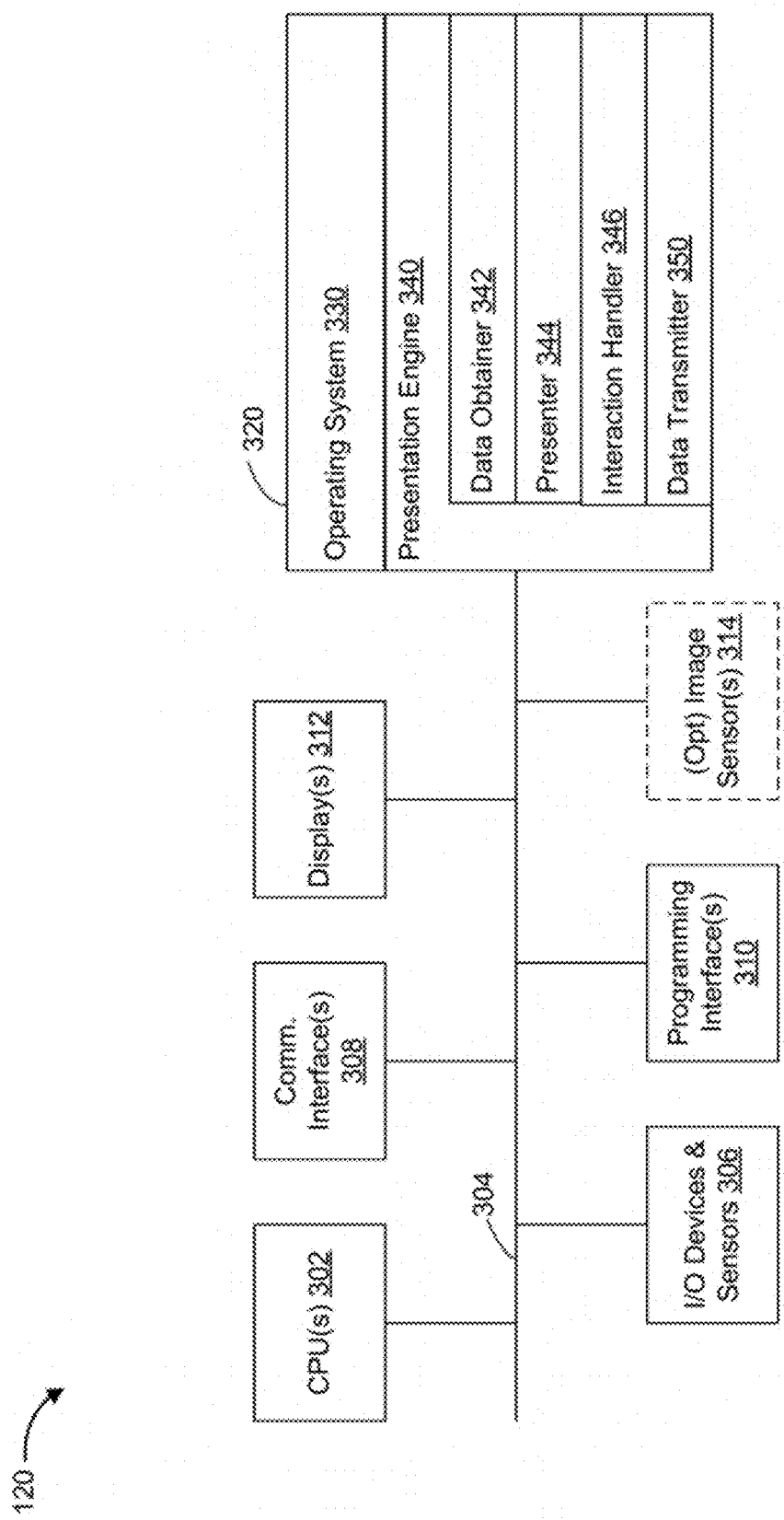
FIG. 3 is a block diagram of an example electronic device in accordance with some implementations.

FIG. 3 is a block diagram of an example of the electronic device 120 (e.g., a mobile phone, tablet, laptop, wearable computing device, or the like) in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the electronic device 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more displays 312, one or more optional interior- and/or exterior-facing image sensors 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a gyroscope, a magnetometer, a thermometer, one or more physiological sensors (e.g., blood pressure monitor, heart rate monitor, blood oxygen sensor, blood glucose sensor, etc.), one or more microphones, one or more speakers, a haptics engine, a heating and/or cooling unit, a skin shear engine, one or more depth sensors (e.g., structured light, time-of-flight, LiDAR, or the like), an eye tracking engine, a body pose tracking engine, a hand/limb tracking engine, a head pose tracking engine, a camera pose tracking engine, and/or the like.

In some implementations, the one or more displays 312 are configured to present the XR environment to the user. In some implementations, the one or more displays 312 are also configured to present flat video content to the user (e.g., a 2-dimensional or "flat" AVI, FLV, WMV, MOV, MP4, or the like file associated with a TV episode or a movie, or live video pass-through of the physical environment 105). In some implementations, the one or more displays 312 correspond to touchscreen displays. In some implementations, the one or more displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more displays 312 correspond to diffractive, reflective, polarized, holographic, etc. waveguide displays. For example, the electronic device 120 includes a single display. In another example, the electronic device 120 includes a display for each eye of the user. In some implementations, the one or more displays 312 are capable of presenting AR and VR content. In some implementations, the one or more displays 312 are capable of presenting AR or VR content.

In some implementations, the one or more optional interior- and/or exterior-facing image sensors 314 correspond to one or more RGB cameras (e.g., with a complementary metal-oxide-semiconductor (CMOS) image sensor or a charge-coupled device (CCD) image sensor), IR image sensors, event-based cameras, and/or the like.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and a presentation engine 340.

The operating system 330 includes procedures for handling various basic system services and for performing hardware dependent tasks. In some implementations, the presentation engine 340 is configured to present content and/or an XR environment to the user via the one or more displays 312. To that end, in various implementations, the presentation engine 340 includes a data obtainer 342, a presenter 344, an interaction handler 346, and a data transmitter 350.

In some implementations, the data obtainer 342 is configured to obtain data (e.g., presentation data such as rendered image frames associated with the XR environment, input data, user interaction data, head tracking information, camera pose tracking information, eye tracking information, body pose tracking information, hand/limb tracking information, sensor data, location data, etc.) from at least one of the I/O devices and sensors 306 of the electronic device 120, the controller 110, and the remote input devices 170A and 170B. To that end, in various implementations, the data obtainer 342 includes instructions and/or logic therefor, and heuristics and metadata therefor.

In some implementations, the presenter 344 is configured to present and update the content and/or the XR environment (e.g., the rendered image frames associated with the XR environment) via the one or more displays 312. To that end, in various implementations, the presenter 344 includes instructions and/or logic therefor, and heuristics and metadata therefor.

In some implementations, the interaction handler 346 is configured to detect user interactions with the presented content and/or XR environment. To that end, in various implementations, the interaction handler 346 includes instructions and/or logic therefor, and heuristics and metadata therefor.

In some implementations, the data transmitter 350 is configured to transmit data (e.g., presentation data, location data, image frames, user interaction data, head tracking information, camera pose tracking information, eye tracking information, body pose tracking information, hand/limb tracking information, depth information, sensor data, etc.) to at least the controller 110. To that end, in various implementations, the data transmitter 350 includes instructions and/or logic therefor, and heuristics and metadata therefor.

Although the data obtainer 342, the presenter 344, the interaction handler 346, and the data transmitter 350 are shown as residing on a single device (e.g., the electronic device 120), it should be understood that in other implementations, any combination of the data obtainer 342, the presenter 344, the interaction handler 346, and the data transmitter 350 may be located in separate computing devices.

Moreover, FIG. 3 is intended more as a functional description of the various features which be present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

FIG. 4 is a block diagram of an example data processing architecture 400 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the data processing architecture 400 includes a privacy subsystem 410, a scene analyzer 420, a content placer 430, and a presentation engine 450. In some implementations, the data processing architecture 400 is included in the controller 110 shown in FIGS. 1 and 2; the electronic device 120 shown in FIGS. 1 and 3; and/or a suitable combination thereof.

As shown in FIG. 4, the input for the data processing architecture 400 corresponds to a representation 402 of the environment (e.g., one or more input image frames of the physical environment 105, or a 3D mesh of the XR environment). For example, one or more input image frames of the physical environment 105 are captured by an exterior-facing image sensor of the electronic device 120 in FIG. 1. In this example, the representation 402 of the environment correspond to a current viewpoint of the physical environment 105 in FIG. 1.

In various implementations, the data processing architecture 400 includes a privacy subsystem 410 that includes one or more privacy filters associated with user information and/or identifying information (e.g., at least a portion of the one or more input image frames of the physical environment 105, or a 3D mesh of the XR environment). In some implementations, the privacy subsystem 410 includes an opt-in feature where the device informs the user as to what user information and/or identifying information is being monitored and how the user information and/or the identifying information will be used. In some implementations, the privacy subsystem 410 selectively prevents and/or limits the data processing architecture 400 or portions thereof from obtaining and/or transmitting the user information. To this end, the privacy subsystem 410 receives user preferences and/or selections from the user in response to prompting the user for the same. In some implementations, the privacy subsystem 410 prevents the data processing architecture 400 from obtaining and/or transmitting the user information unless and until the privacy subsystem 410 obtains informed consent from the user. In some implementations, the privacy subsystem 410 anonymizes (e.g., scrambles or obscures) certain types of user information (e.g., at least a portion of the one or more input image frames of the physical environment 105, or a 3D mesh of the XR environment). For example, the privacy subsystem 410 receives user inputs designating which types of user information the privacy subsystem 410 anonymizes. As another example, the privacy subsystem 410 anonymizes certain types of user information likely to include sensitive and/or identifying information (e.g., at least a portion of the one or more input image frames of the physical environment 105, or a 3D mesh of the XR environment), independent of user designation (e.g., automatically).

In various implementations, the data processing architecture 400 includes a scene analyzer 420 configured to process the representation 402 of the environment (e.g., captured by an exterior-facing image sensor) associated with a physical environment. In some implementations, the scene analyzer 420 determines a plurality of candidate content placement locations within the physical environment that satisfy content placement criterion (e.g., based on semantic segmentation, plane recognition, and/or other image processing techniques). For example, the content placement criterion is satisfied when a candidate placement location corresponds to a planar surface, a non-trademarked surface, a non-cluttered surrounding area, a non-distracting/dangerous location, a surface area that is at least X by Y cm in size, and/or the like.

In some implementations, the scene analyzer 420 also determines a characterization vector 414 for each of the plurality of candidate content placement locations, wherein the characterization vector 414 includes a plurality of characterization parameters. For example, the plurality of characterization parameters included in the characterization vector 414 for a respective candidate content placement location 412 include: an angle of the respective candidate content placement location 412 relative to a camera position/pose; velocity and acceleration values associated with the respective candidate content placement location 412 relative to the camera position/pose; color and texture information associated with the respective candidate content placement location 412; dimensions, volume, surface area, etc. associated with the respective candidate content placement location 412; contrast and brightness information associated with the respective candidate content placement location 412; semantic information associated with the respective candidate content placement location 412 (e.g., type of object or surface); and/or the like. A characterization vector for a respective candidate placement location is discussed in more detail below with reference to FIG. 7.

In various implementations, the data processing architecture 400 includes a content placer 430 configured to select XR content 434 for a respective candidate content placement location 412 among the plurality of candidate content placement locations. As one example, the content placer 430 selects the XR content 434 to be placed at the respective candidate content placement 412 location according to a determination that a match, comparison, or difference between content parameters (e.g., texture, color, brightness, size, etc.) associated with the XR content 434 and characterization parameters for the respective candidate content placement 412. In some implementations, the content placer 430 determines that a match occurs between the XR content 434 and the respective candidate content placement 412 when a selection criterion is satisfied. For example, the selection criterion corresponds to a threshold variance between the content parameters associated with XR content 434 and characterization parameters for the respective candidate content placement location 412.

In some implementations, the content placer 430 corresponds to a local content manager that places XR content in at least some of plurality of candidate content placement locations based on other information 432 such as current GPS coordinates associated with the electronic device 120 (e.g., location-specific XR content), user preferences, device usage history, search history, social media content associated with one or more social media profiles of a user of the electronic device 120, and/or the like. In some implementations, the content placer 430 corresponds to an application programming interface (API) that enables third parties to place the XR content (e.g., auction off the plurality of candidate content placement locations for third-party advertisement placements).

In various implementations, the data processing architecture 400 includes a presentation engine 450 that presents the XR content 434 at the respective candidate content placement location 412. As one example, when the electronic device 120 corresponds to an optical-see through implementation, the electronic device 120 projects the XR content 434 onto the optical-see through display (e.g., an additive display) such that the XR content 434 appears to be displayed at the respective candidate content placement location 412. As another example, when the electronic device 120 corresponds to a video pass-through implementation, the controller 110, the electronic device 120, or a suitable combination thereof composites the XR content 434 with the representation 402 of the environment such that the resultant rendered image frame 452 shows the XR content 434 placed within the physical environment at the respective candidate content placement location 412. Continuing with this example, the electronic device 120 displays the resultant rendered image frame 452.

FIG. 4 is intended more as functional description of the various features which may be present in a particular implementation as opposed to a structural schematic of the implementations described herein. As recognized by those of ordinary skill in the art, items shown separately could be combined and some items could be separated. For example, some functional modules shown separately in FIG. 4 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 5A:
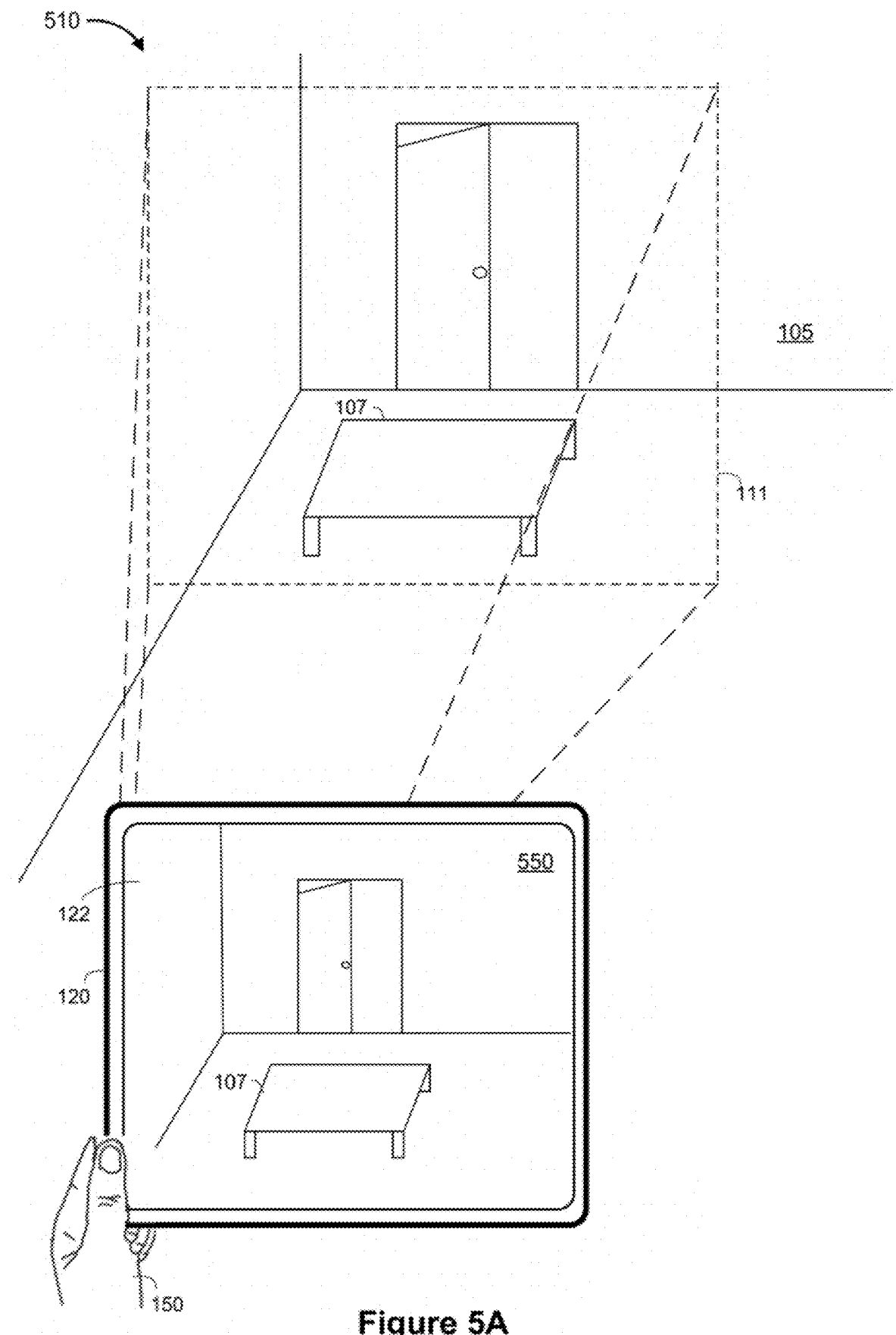
FIGS. 5A-5C illustrate a sequence of instances of an extended reality (XR) presentation scenario in accordance with some implementations.
Figure 5B:
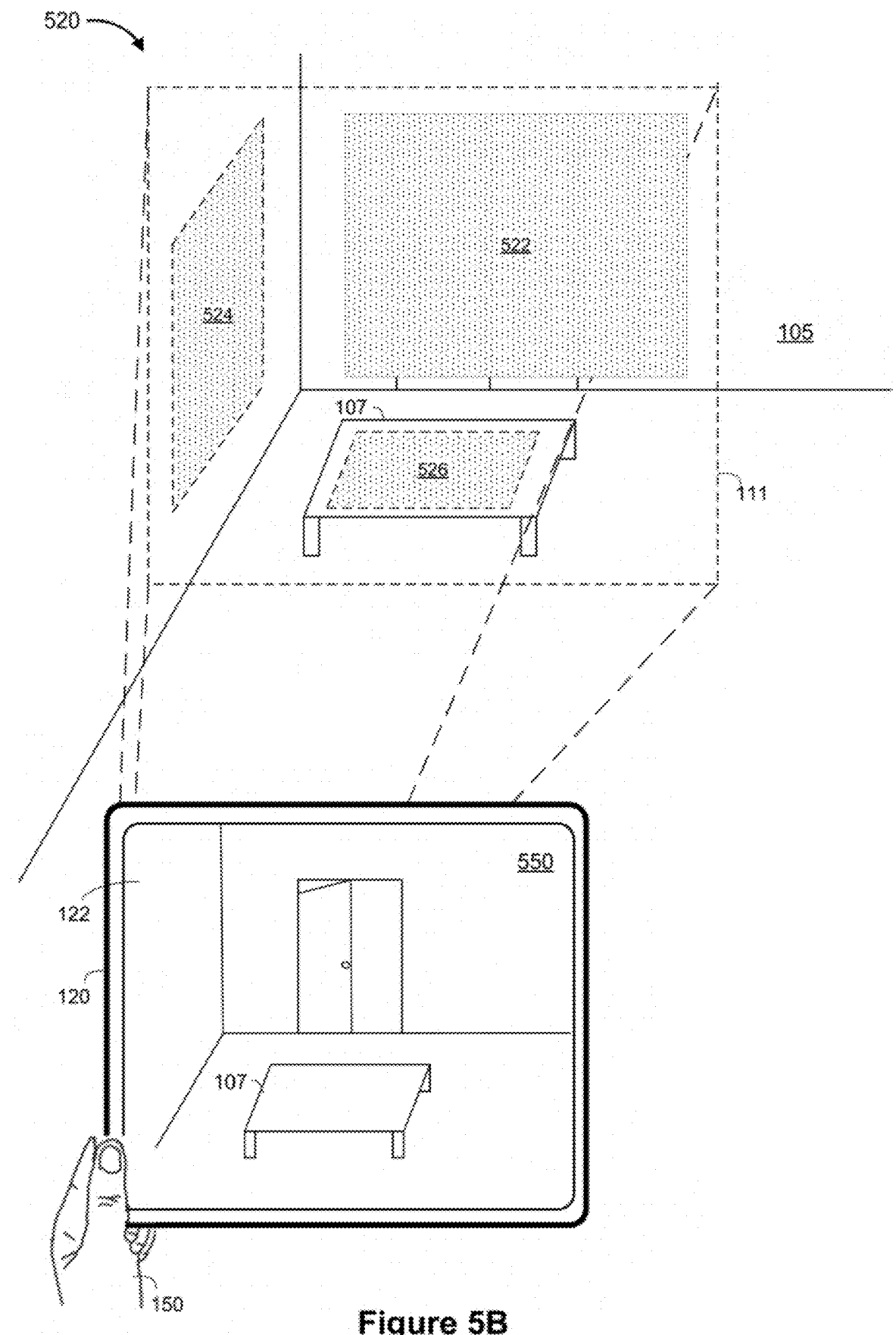
Figure 5C:
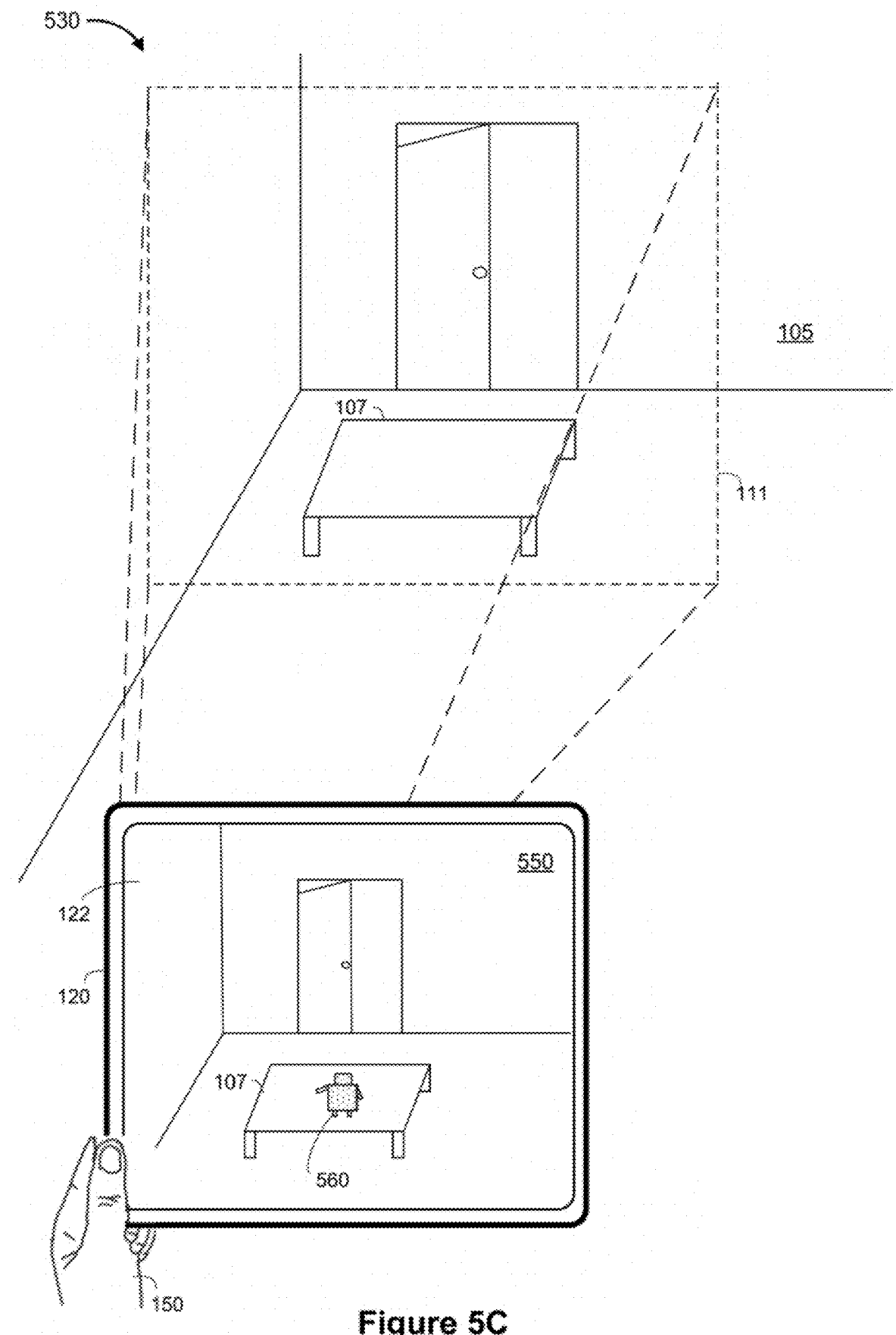

FIGS. 5A-5C illustrate a sequence of instances 510, 520, and 530 of an extended reality (XR) presentation scenario in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein.

As shown in FIGS. 5A-5C, the XR presentation scenario includes a physical environment 105 and an XR environment 550 displayed on the display 122 of the electronic device 120. The electronic device 120 presents an XR environment 550 to the user 150 while the user 150 is physically present within the physical environment 105 that includes the table 107 within the FOV 111 of an exterior-facing image sensor of the electronic device 120. As such, in some implementations, the user 150 holds the electronic device 120 in his/her hand(s) similar to the operating environment 100 in FIG. 1.

In other words, in some implementations, the electronic device 120 is configured to present XR content and to enable optical see-through or video pass-through of at least a portion of the physical environment 105 (e.g., including the table 107) on the display 122 (e.g., the XR environment 550). For example, the electronic device 120 corresponds to a mobile phone, tablet, laptop, wearable computing device, or the like.

As shown in FIG. 5A, during the instance 510 (e.g., associated with time $T_1$) of the presentation scenario, the electronic device 120 presents the XR environment 550 including video pass-through of at least a portion of the physical environment 105 (e.g., including the table 107) on the display 122.

As shown in FIG. 5B, during the instance 520 (e.g., associated with time $T_2$) of the presentation scenario, the controller 110, the electronic device 120, or a suitable combination thereof analyzes the XR environment 550 and determines a plurality of candidate content placement locations by determining which of locations 522, 524, and 526 satisfy the content placement criterion. For example, the content placement criterion is satisfied when the location corresponds to a planar surface that is at least X cm by Y cm, the location is situated at less than a Z degree angle relative to the exterior-facing image sensor of the electronic device 120, and the location does not cause occlusion(s).

In the example associated with FIG. 5B, the location 522 fails to satisfy the content placement criterion because the location 522 occludes a doorway within the physical environment 105. As shown in FIG. 5B, the location 524 fails to satisfy the content placement criterion because the location 524 is situated at an oblique angle relative to the exterior-facing image sensor of the electronic device 120 that is greater than Z degrees.

In FIG. 5B, the location 526 satisfies the content placement criterion because the location 526 corresponds to a planar surface that is at least X cm by Y cm, is situated at less than a Z degree angle relative to the exterior-facing image sensor of the electronic device 120, and does not occlude any objects within the physical environment 105 (e.g., the table 107 corresponds to an unobstructed planar surface).

As shown in FIG. 5C, during the instance 530 (e.g., associated with time $T_3$) of the presentation scenario, the electronic device 120 presents the XR environment 550 including video pass-through of at least a portion of the physical environment 105 (e.g., including the table 107) on the display 122 and the XR content 560 at the location 526. For example, in some implementations, the XR content 560 may be static or dynamic. For example, in some implementations, the XR content 560 may transition from a static mode (e.g., stationary) to a dynamic mode (e.g., animation or other movement) in response to detecting a user interaction with the XR content 560. For example, in some implementations, the XR content 560 may transition from a static mode to a dynamic mode in response to detecting that the direction of the gaze of the user 150 has lingered on the XR content 560 for at least a predefined duration of time.

Figure 6A:
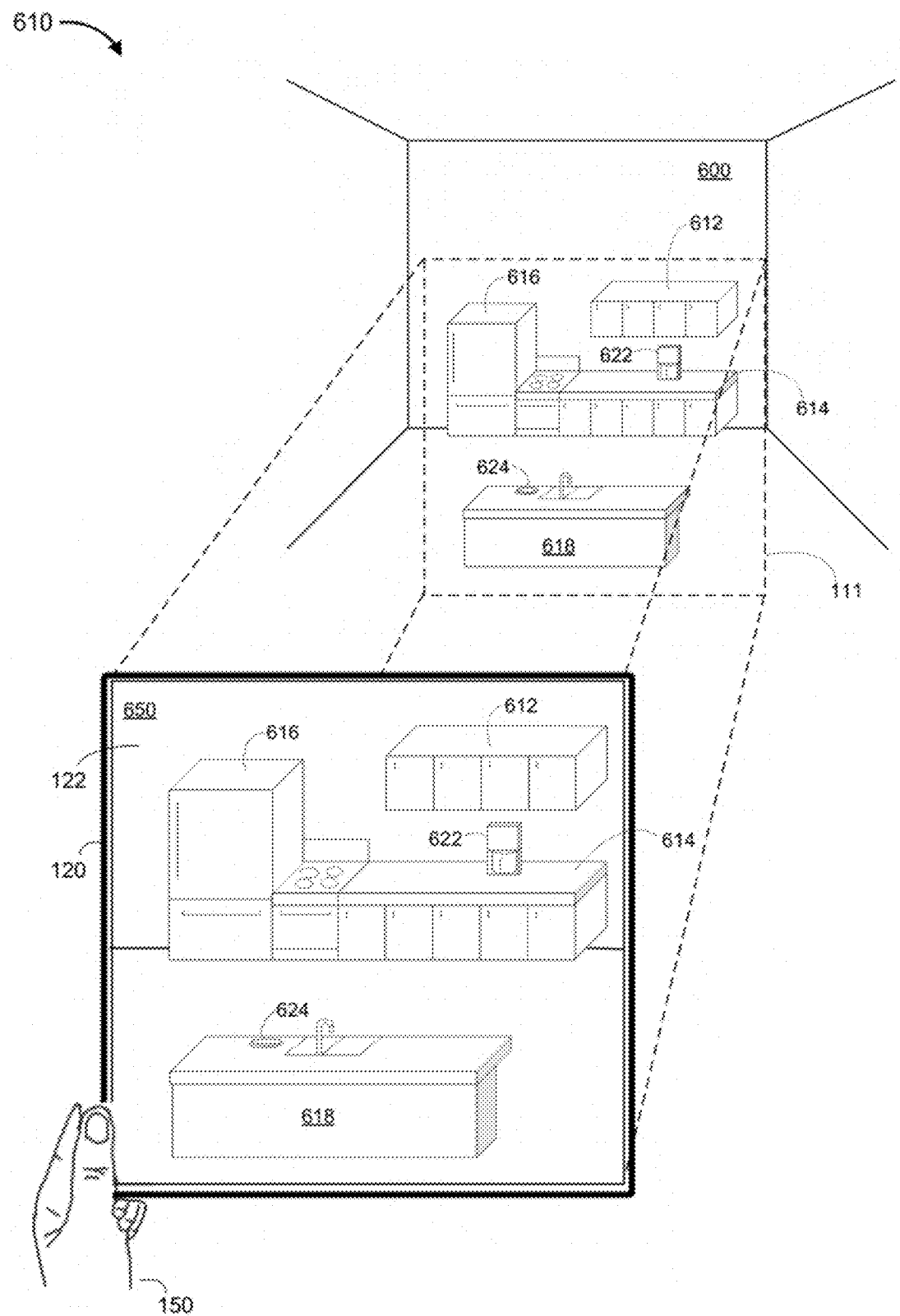
FIGS. 6A-6C illustrate a sequence of instances of an XR presentation scenario in accordance with some implementations.
Figure 6B:
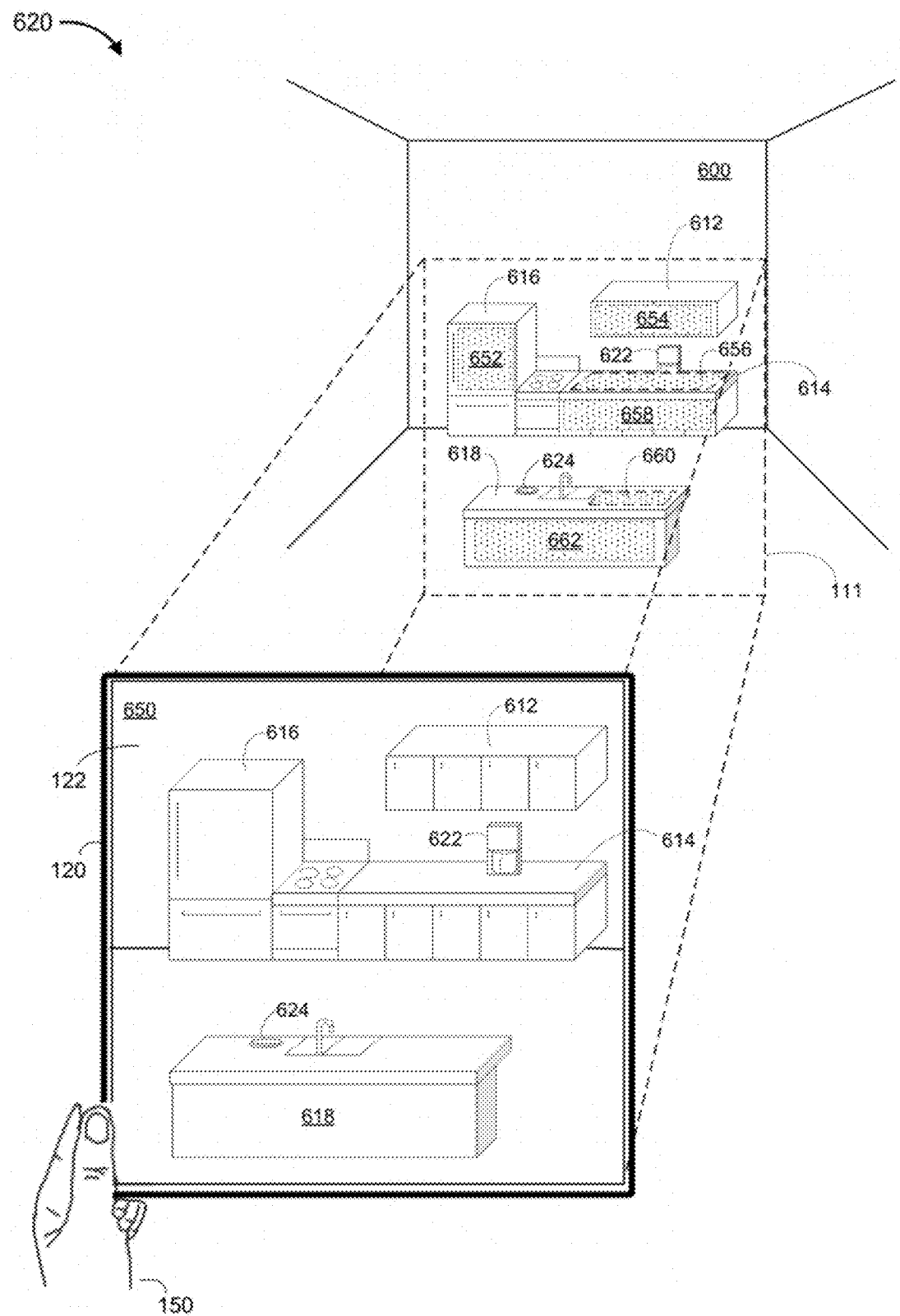
Figure 6C:
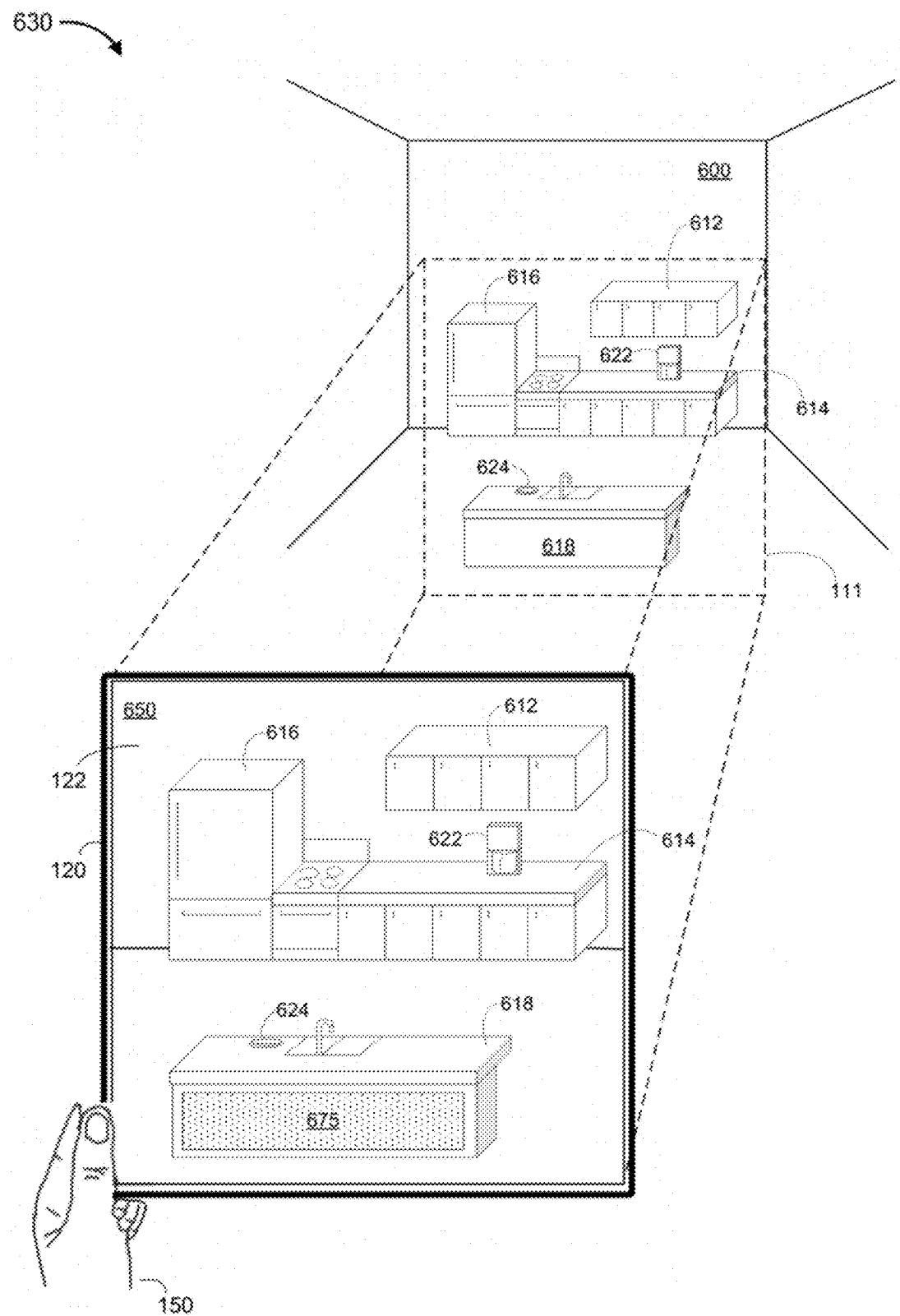

FIGS. 6A-6C illustrate a sequence of instances 610, 620, and 630 of an extended reality (XR) presentation scenario in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein.

As shown in FIGS. 6A-6C, the XR presentation scenario includes a physical environment 600 and an XR environment 650 displayed on the display 122 of the electronic device 120. The electronic device 120 presents an XR environment 650 to the user 150 while the user 150 is physically present within the physical environment 600 (e.g., a kitchen) that includes a set of cabinets 612, a countertop 614, a refrigerator 616, a kitchen island 618, a coffee maker 622, and a stack of dishes 624 within the FOV 111 of an exterior-facing image sensor of the electronic device 120. As such, in some implementations, the user 150 holds the electronic device 120 in his/her hand(s) similar to the operating environment 100 in FIG. 1.

In other words, in some implementations, the electronic device 120 is configured to present XR content and to enable optical see-through or video pass-through of at least a portion of the physical environment 600 on the display 122 (e.g., the XR environment 650). For example, the electronic device 120 corresponds to a mobile phone, tablet, laptop, wearable computing device, or the like.

As shown in FIG. 6A, during the instance 610 (e.g., associated with time T1) of the presentation scenario, the electronic device 120 presents the XR environment 650 including video pass-through of at least a portion of the physical environment 600 (e.g., a portion of the kitchen including the set of cabinets 612, the countertop 614, the refrigerator 616, the kitchen island 618, the coffee maker 622, and the stack of dishes 624) on the display 122.

As shown in FIG. 6B, during the instance 620 (e.g., associated with time $T_2$) of the presentation scenario, the controller 110, the electronic device 120, or a suitable combination thereof analyzes the XR environment 650 and determines a plurality of candidate content placement locations by determining which of locations 652, 654, 656, 658, 660, and 662 satisfy the content placement criterion. For example, the content placement criterion is satisfied when the location corresponds to a planar surface that is at least X cm by Y cm, the location is situated at less than a Z degree angle relative to the exterior-facing image sensor of the electronic device 120, the location does not cause occlusion(s), and the area surrounding the location is not cluttered.

In the example associated with FIG. 6B, the locations 652, 654, and 658 fail to satisfy the content placement criterion because the locations 652, 654, and 658 are both cluttered and cause occlusion(s) of objects within the physical environment 600. As shown in FIG. 5B, the locations 656 and 660 fail to satisfy the content placement criterion because the locations 656 and 660 are situated at oblique angles relative to the exterior-facing image sensor of the electronic device 120 that are greater than Z degrees.

In FIG. 6B, the location 662 (e.g., the front vertical surface of the kitchen island 618) satisfies the content placement criterion because the location 662 corresponds to a planar surface that is at least X cm by Y cm, is situated at less than a Z degree angle relative to the exterior-facing image sensor of the electronic device 120, does not occlude any objects within the physical environment 600, and the area surrounding the location is non-cluttered (e.g., the front vertical surface of the kitchen island 618 corresponds to an unobstructed planar surface).

As shown in FIG. 6C, during the instance 630 (e.g., associated with time $T_3$) of the presentation scenario, the electronic device 120 presents the XR environment 650 including video pass-through of at least a portion of the physical environment 600 (e.g., including the set of cabinets 612, the countertop 614, the refrigerator 616, the kitchen island 618, the coffee maker 622, and the stack of dishes 624) on the display 122 and the XR content 675 at the location 662. For example, in some implementations, the XR content 675 may be static or dynamic.

Figure 7:
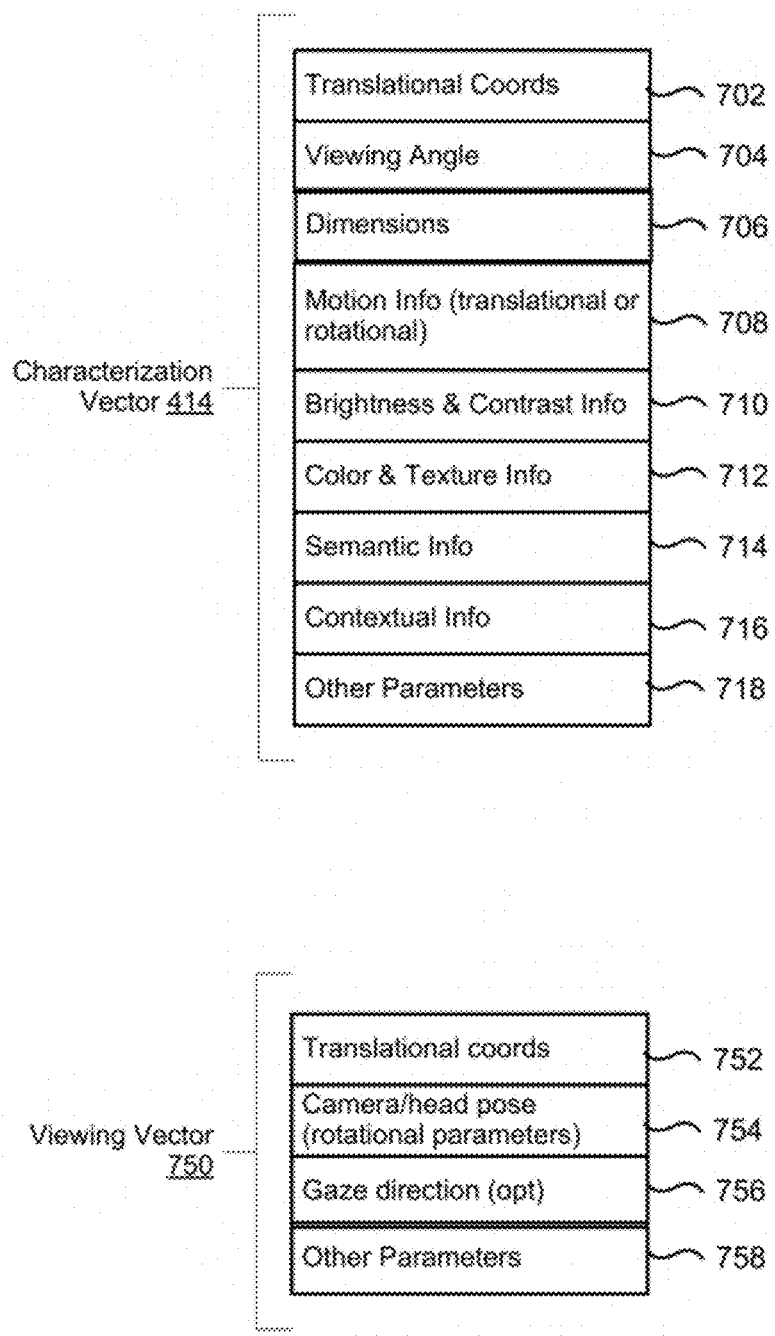
FIG. 7 illustrates block diagrams of example data structures in accordance with some implementations.

FIG. 7 illustrates block diagrams of example data structures in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. FIG. 7 shows block diagrams of a data structures for a characterization vector 414 and a viewing vector 750.

For example, the controller 110 or a component thereof (e.g., the scene analyzer 420) obtains (e.g., receives, retrieves, or generates) the characterization vector 414 for a respective candidate placement location within a physical environment by performing one or more image processing techniques (e.g., semantic segmentation, color analysis, texture analysis, etc.) on representation 402 of the environment. According to some implementations, the characterization vector 414 includes: translational coordinates 702 for the respective candidate placement location (e.g., absolute coordinates or coordinates relative to the physical environment); a viewing angle 704 of the respective candidate placement location relative to the camera origin associated with the representation 402 of the environment; dimensions 705 for the respective candidate placement location (e.g., width, depth, height, volume, surface area, etc.); motion information 708 for the respective candidate placement location (e.g., translational and/or rotational speed, acceleration, etc. relative to the camera origin associated with the representation 402 of the environment); brightness and contrast information 710 for the respective candidate placement location; color and texture information 712 for the respective candidate placement location; semantic information 714 associated with the respective candidate placement location (e.g., a type of surface or object that corresponds to the respective candidate placement location such as wall, tabletop, vase, back of couch, etc.) for the respective candidate placement location; contextual information 716 associated with the respective candidate placement location (e.g., nearby objects, nearby surfaces, overall room/space type, overall building type, GPS coordinates, etc.); and other parameters 718.

For example, the controller 110 or a component thereof (e.g., the viewing vector manager 247 in FIG. 2) obtains (e.g., receives, retrieves, or generates) the viewing vector 750 based on body pose tracking information, head tracking information, camera pose tracking information, eye tracking information, hand/limb tracking information, intrinsic camera parameters, and/or the like from the electronic device 120. For example, the viewing vector 750 defines the viewpoint of the physical environment from which the representation 402 of the environment was captured. According to some implementations, the viewing vector 750 includes: translational coordinates 752 relative to the physical environment, camera/head pose information 754 (e.g., rotational parameters) associated with the user or camera, an optional gaze direction 756 (e.g., 2 degrees of freedom associated with eye tracking when a near-eye system is used) associated with the user, and other parameters 758 (e.g., focal length, zoom, and/or the like). As such, for example, the viewing vector 750 may comprise at least 8 degrees of freedom: x, y, z dimensions associated with the translational coordinates 752; roll, pitch, and yaw dimensions associated with the camera/head pose information 754; and first and second dimensions associated with the gaze direction 756. For example, the controller 110 or a component thereof (e.g., the viewing vector manager 247 in FIG. 2) updates the viewing vector 750 over time due to translational and/or rotational movement.

Figure 8:
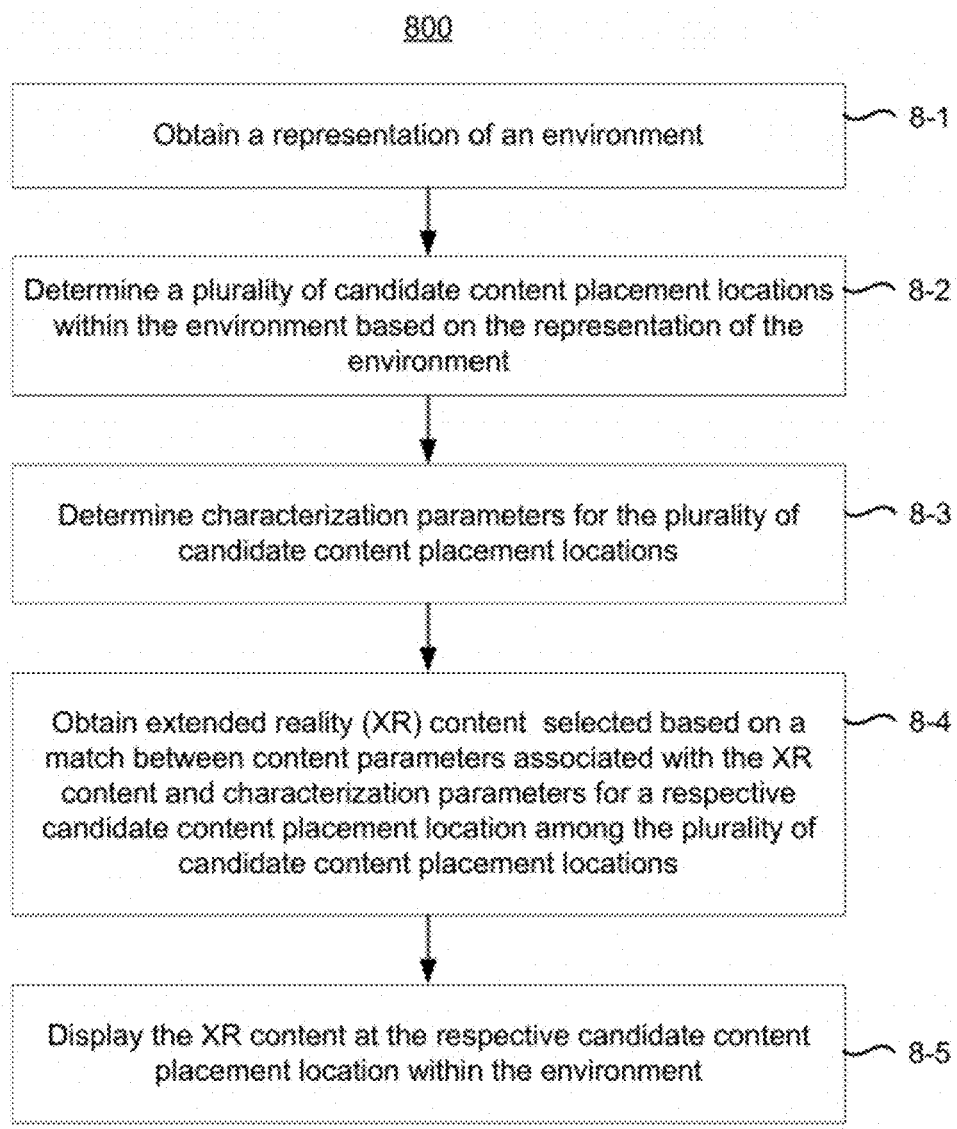
FIG. 8 is a flowchart representation of a method of content placement in accordance with some implementations.

FIG. 8 is a flowchart representation of a method 800 of content placement in accordance with some implementations. In various implementations, the method 800 is performed by at a computing system including non-transitory memory and one or more processors, wherein the computing system is communicatively coupled to a display device and one or more input devices (e.g., the controller 110 in FIGS. 1 and 2; the electronic device 120 in FIGS. 1 and 3; or a suitable combination thereof), or a component thereof. In some implementations, the method 800 is performed by processing logic, including hardware, firmware, software, or a combination thereof. In some implementations, the method 800 is performed by a processor executing code stored in a non-transitory computer-readable medium (e.g., a memory). In various implementations, some operations in method 800 are, optionally, combined and/or the order of some operations is, optionally, changed.

As described above, in some instances, typical content placement (e.g., advertisements) in video games or other media is both static and manually placed by the media creator. By contrast, according to some implementations, a physical environment or an extended reality (XR) environment is parsed for candidate content placement locations. Furthermore, characterization parameters (e.g., contextual metadata) for those candidate content placement locations are determined in order to make a more informed decision when placing XR content thereon. In some examples, an application-programming interface (API) enables third parties to determine whether to place XR content within the XR environment at those candidate content placement locations based on the characterization parameters therefor.

As represented by block 8-1, the method 800 includes obtaining (e.g., receiving, retrieving, or capturing) a representation of an environment. In some implementations, the exterior-facing image sensors 314 of the electronic device 120 captures one or more image frames of the physical environment 105 (e.g., the representation of the environment) and subsequently provide the one or more image frames to the controller 110. In some implementations, the controller 110 obtains a representation of the environment such as rendered image frames, a 3D mesh, or a 3D model thereof for the environment.

As represented by block 8-2, the method 800 includes determining a plurality of candidate content placement locations within the environment based on the representation of the environment. In some implementations, the controller 110 or a component thereof (e.g., the scene analyzer 420 in FIGS. 2 and 4) determines a plurality of candidate content placement locations within the physical environment that satisfy the content placement criterion. In some implementations, the controller 110 or a component thereof (e.g., the scene analyzer 420 in FIGS. 2 and 4) determines a plurality of candidate content placement locations within the environment based on the representation of the environment (e.g., the rendered image frames, a 3D mesh, or a 3D model thereof for the environment).

In some implementations, each of the plurality of candidate content placement locations satisfies the content placement criterion. For example, the content placement criterion is satisfied when a candidate placement location corresponds to a planar surface, a non-trademarked surface, a non-cluttered surrounding area, a non-distracting/dangerous location, at least X by Y cm in size, and/or the like.

In some implementations, the content placement criterion is satisfied when a candidate content placement location corresponds to a planar surface. For example, the scene analyzer 420 performs plane recognition on the representation of the environment (e.g., one or more image frames of the physical environment 105 or a 3D mesh of the XR environment). In some implementations, the content placement criterion is satisfied when a candidate content placement location satisfies dimensional parameters. (e.g., X cm by Y cm in size). For example, the scene analyzer 420 estimates the surface area of the recognized planes based on the representation of the environment (e.g., one or more image frames or a 3D mesh) and optional depth information associated with the physical environment.

In the example associated with FIG. 5B, the location 522 fails to satisfy the content placement criterion because the location 522 occludes a doorway within the physical environment 105. As shown in FIG. 5B, the location 524 fails to satisfy the content placement criterion because the location 524 is situated at an oblique angle relative to the exterior-facing image sensor of the electronic device 120 that is greater than Z degrees. In FIG. 5B, the location 526 satisfies the content placement criterion because the location 526 corresponds to a planar surface that is at least X cm by Y cm, is situated at less than a Z degree angle relative to the exterior-facing image sensor of the electronic device 120, and does not occlude any objects within the physical environment 105 (e.g., the table 107 corresponds to an unobstructed planar surface).

In some implementations, the content placement criterion is not satisfied when a candidate content placement location is associated with rotational motion. As such, for example, XR content is not placed on rotating bodies. In some implementations, the content placement criterion is not satisfied when a candidate content placement location is associated with translational motion greater than a threshold velocity. As such, for example, XR content is not placed on bodies that are translating faster than a threshold velocity or acceleration. For example, the scene analyzer 420 determines velocity and acceleration values for the translational and/or rotational movement of the candidate content placement locations by analyzing the displacement of the candidate content placement locations across two or more image frames.

As represented by block 8-3, the method 800 includes determining characterization parameters for the plurality of candidate content placement locations. In some implementations, the controller 110 or a component thereof (e.g., the scene analyzer 420 in FIGS. 2 and 4) determines a characterization vector for each of the plurality of candidate content placement locations that includes a plurality of characterization parameters. For example, the plurality of characterization parameters included in the characterization vector 414 for a respective candidate content placement location 412 include: an angle of the respective candidate content placement location 412 relative to a camera position/pose; velocity and acceleration values associated with the respective candidate content placement location 412 relative to the camera position/pose; color and texture information associated with the respective candidate content placement location 412; dimensions, volume, surface area, etc. associated with the respective candidate content placement location 412; contrast and brightness information associated with the respective candidate content placement location 412; semantic information associated with the respective candidate content placement location 412 (e.g., type of object or surface); and/or the like. A characterization vector for a respective candidate placement location is discussed in more detail below with reference to FIG. 7.

In some implementations, the characterization parameters associated with the respective candidate content placement location corresponds to at least one of a brightness value, an albedo value, texture information, material information, contrast information, dimensional values, and location type associated with the respective candidate content placement location. For example, the location type for a respective candidate content placement location may correspond to one of a wall, table, couch, chair, object, etc.

As represented by block 8-4, the method 800 includes obtaining (e.g., receiving, retrieving, or determining) XR content selected based on a match between content parameters associated with XR content and characterization parameters for a respective candidate content placement location among the plurality of candidate content placement locations. In some implementations, with reference to FIG. 4, the controller 110 or a component thereof (e.g., the content placer 430 in FIGS. 2 and 4) selects XR content 434 for a respective candidate content placement location 412 among the plurality of candidate content placement locations. As shown in FIG. 5C, for example, the controller 110 or a component thereof (e.g., the content placer 430 in FIGS. 2 and 4) selects the XR content 560 for the location 526.

As one example, the content placer 430 selects the XR content 434 to be placed at the respective candidate content placement location 412 location when a comparison or difference between content parameters associated with the XR content 434 and characterization parameters for the respective candidate content placement location 412 satisfies a selection criterion (i.e., the match occurs when the selection criterion is satisfied). For example, the selection criterion corresponds to a threshold variance between the content parameters associated with XR content 434 and characterization parameters for the respective candidate content placement location 412. As one example, the content placer 430 choses XR content that matches (within a threshold tolerance) the color, size, contrast, brightness, etc. of the respective candidate content placement location.

In some implementations, the content placer 430 corresponds to a local content manager that places XR content in at least some of plurality of candidate content placement locations based on other information 432 such as current GPS coordinates associated with the electronic device 120 (e.g., location-specific XR content), user preferences, device usage history, search history, social media content associated with one or more social media profiles of a user of the electronic device 120, and/or the like. In some implementations, the content placer 430 corresponds to an API that enables third parties to place XR content within the XR environment. For example, the plurality of candidate content placement locations is auctioned off for content placement purposes and bid on by third-party advertisement placement services.

In some implementations, the XR content is selected based on contextual information associated with the XR environment. For example, the content placer 430 may also consider contextual information when selecting XR content 434 for a respective candidate content placement location

412. According to some implementations, the contextual information corresponds to user history information associated with usage of the scene or the electronic device, user search history, crowd-sourced usage history information, GPS/location data, etc. In some implementations, the GPS/location data may be used to select the XR content if a user previously opted-into the usage thereof. In some implementations, the user history information and/or user search history may be used to select the XR content if a user previously opted-into the usage thereof.

As represented by block 8-5, the method 800 includes displaying the XR content at the respective candidate content placement location within the environment. As one example, when the electronic device 120 corresponds to an optical-see through implementation, the electronic device 120 or a component thereof (e.g., the presentation engine 450 in FIG. 4) projects the XR content 434 onto the optical-see through display (e.g., an additive display) such that the XR content 434 appears to be displayed at the respective candidate content placement location 412 (e.g., overlay the XR content). As another example, when the electronic device 120 corresponds to a video pass-through implementation, the controller 110 or a component thereof (e.g., the presentation engine 450 in FIG. 4) composites the XR content 434 with the representation 402 of the environment such that the resultant rendered image frame 452 shows the XR content 434 placed within the physical environment at the respective candidate content placement location 412 (e.g., composite the XR content). Continuing with this example, the electronic device 120 displays the resultant rendered image frame 452. As shown in FIG. 5C, for example, the electronic device 120 presents the XR environment 550 including video pass-through of at least a portion of the physical environment 105 (e.g., including the table 107) on the display 122 and the XR content 560 at the location 526.

In some implementations, the method 800 further includes: detecting a change of pose across time relative to the scene; and in response to detecting the change of pose, maintaining the XR content at the respective candidate content placement location within the scene. For example, the controller 110 or a component thereof (e.g., the viewing vector manager 247 in FIG. 2) detects a change to the viewing vector and, in turn, coordinates with the presentation engine 450 to maintain the XR content at the respective candidate content placement location even though the viewing vector has changed (e.g., a rotational or translational movement associated with the camera/head pose of the electronic device 120). Therefore, spatial and temporal coherency for the XR content is maintained such that when a user looks away from and looks back at the respective candidate content placement location the XR content is still shown thereupon. A viewing vector is described in more detail above with reference to FIG. 7.

In some implementations, the XR content corresponds to static XR content. In some implementations, the method 800 further includes: in accordance with a determination that a user interest criterion is satisfied, updating the XR content from static XR content to dynamic XR content. For example, the user interest criterion is satisfied when the user's gaze is focused on the XR content for at least Z seconds, the user selects or otherwise interacts with the XR content, or the like. For example, the static XR content may correspond to stationary text or images, and the dynamic XR content may correspond to animated 3D XR objects, video content, a sequence of text/images, and/or the like.

In some implementations, the method 800 further includes: detecting a user input that corresponds to modifying the XR content; and in response to detecting the user input, modifying the XR content. For example, modifying the XR content corresponds to performing at least one of the following operations on the XR content: scaling, translating, rotating, animating, coloring, texturing, shading, reshaping, and/or the like. For example, the controller 110 or a component thereof (e.g., the interaction and manipulation engine 248 in FIG. 2) obtains an indication of a user input that corresponds to modifying the XR content and, subsequently, modifies the XR content accordingly. For example, the user input corresponds to a hand/limb tracking input, a voice input, a gaze input, a touch input, or the like detected by the controller 110, the electronic device 120, and/or the remote input devices 170A and 170B.

In some implementations, the method 800 further includes: detecting a user input that corresponds to selecting the XR content; and in response to detecting the user input, displaying additional information associated with the XR content. For example, the controller 110 or a component thereof (e.g., the interaction and manipulation engine 248 in FIG. 2) obtains an indication of a user input that corresponds to selecting the XR content and, subsequently, obtains and/or provides additional information associated with the XR content. For example, the user input corresponds to a hand/limb tracking input, a voice input, a gaze input, a touch input, or the like detected by the controller 110, the electronic device 120, and/or the remote input devices 170A and 170B. For example, the additional information corresponds to details regarding the XR content or a company associated with the XR content (e.g., nutritional information for XR content associated with food, a phone number and customer reviews for XR content associated with a vendor or service provider, etc.). In some implementations, the additional information is displayed in a pop-up overlay. In some implementations, the additional information is displayed is a new web browser window or a new window associated with another application.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
at a computing system including non-transitory memory and one or more processors, wherein the computing system is communicatively coupled to a display device and one or more input devices:
obtaining a representation an environment;
determining a plurality of candidate content placement locations within the environment based on the representation of the environment;
determining characterization parameters for the plurality of candidate content placement locations;
obtaining extended reality (XR) content selected based on a match between content parameters associated with the XR content and characterization parameters for a respective candidate content placement location among the plurality of candidate content placement locations;
displaying, via the display device, the XR content at the respective candidate content placement location within the environment;
detecting, via the one or more input devices, a change of pose across time relative to the environment; and
in response to detecting the change of pose, maintaining the XR content at the respective candidate content placement location within the environment.

2. The method of claim 1, wherein each of the plurality of candidate content placement locations satisfies a content placement criterion.

3. The method of claim 2, wherein the content placement criterion is satisfied when a candidate content placement location satisfies dimensional parameters.

4. The method of claim 2, wherein the content placement criterion is satisfied when a candidate content placement location corresponds to a planar surface.

5. The method of claim 2, wherein the content placement criterion is not satisfied when a candidate content placement location is associated with rotational motion.

6. The method of claim 2, wherein the content placement criterion is not satisfied when a candidate content placement location is associated with translational motion greater than a threshold velocity.

7. The method of claim 1, wherein the characterization parameters associated with the respective candidate content placement location corresponds to at least one of a brightness value, an albedo value, texture information, material information, contrast information, dimensional values, and location type associated with the respective candidate content placement location.

8. The method of claim 1, wherein the XR content is selected based on contextual information associated with the environment.

9. The method of claim 8, wherein the contextual information includes at least one of: location information according to a determination that an opt-in input has been detected from a user of the electronic device, or historical usage information according to a determination that an opt-in input has been detected from a user of the electronic device.

10. The method of claim 1, wherein the XR content corresponds to static XR content.

11. The method of claim 10, further comprising:
in accordance with a determination that a user interest criterion is satisfied, updating the XR content from static XR content to dynamic XR content.

12. The method of claim 1, further comprising:
detecting a user input that corresponds to selecting the XR content; and
in response to detecting the user input, displaying additional information associated with the XR content.

13. A computing system comprising:
one or more processors;
a non-transitory memory;
a communication interface for communicating with a display device and one or more input devices; and
one or more programs stored in the non-transitory memory, which, when executed by the one or more processors, cause the computing system to:
obtain a representation an environment;
determine a plurality of candidate content placement locations within the environment based on the representation of the environment;
determine characterization parameters for the plurality of candidate content placement locations;
obtain extended reality (XR) content selected based on a match between content parameters associated with the XR content and characterization parameters for a respective candidate content placement location among the plurality of candidate content placement locations;
display, on the display device, the XR content at the respective candidate content placement location within the environment;
detect, via the one or more input devices, a change of pose across time relative to the environment; and
in response to detecting the change of pose, maintain the XR content at the respective candidate content placement location within the environment.

14. The computing system of claim 13, wherein the characterization parameters associated with the respective candidate content placement location corresponds to at least one of a brightness value, an albedo value, texture information, material information, contrast information, dimensional values, and location type associated with the respective candidate content placement location.

15. The computing system of claim 13, wherein the XR content is selected based on contextual information associated with the environment.

16. The computing system of claim 15, wherein the contextual information includes at least one of: location information according to a determination that an opt-in input has been detected from a user of the electronic device, or historical usage information according to a determination that an opt-in input has been detected from a user of the electronic device.

17. The computing system of claim 13, wherein each of the plurality of candidate content placement locations satisfies a content placement criterion.

18. The computing system of claim 17, wherein the content placement criterion is satisfied when at least one of: a candidate content placement location satisfies dimensional parameters or a candidate content placement location corresponds to a planar surface.

19. The computing system of claim 17, wherein the content placement criterion is not satisfied when at least one of: a candidate content placement location is associated with rotational motion or a candidate content placement location is associated with translational motion greater than a threshold velocity.

20. A non-transitory memory storing one or more programs, which, when executed by one or more processors of a computing system with a communication interface for communicating with a display device and one or more input devices, cause the device to:
obtain a representation an environment;
determine a plurality of candidate content placement locations within the environment based on the representation of the environment;
determine characterization parameters for the plurality of candidate content placement locations;
obtain extended reality (XR) content selected based on a match between content parameters associated with the XR content and characterization parameters for a respective candidate content placement location among the plurality of candidate content placement locations;
display, on the display device, the XR content at the respective candidate content placement location within the environment;
detect, via the one or more input devices, a change of pose across time relative to the environment; and
in response to detecting the change of pose, maintain the XR content at the respective candidate content placement location within the environment.

21. The non-transitory memory of claim 20, wherein the characterization parameters associated with the respective candidate content placement location corresponds to at least one of a brightness value, an albedo value, texture information, material information, contrast information, dimensional values, and location type associated with the respective candidate content placement location.

22. The non-transitory memory of claim 20, wherein the XR content is selected based on contextual information associated with the environment.

23. The non-transitory memory of claim 22, wherein the contextual information includes at least one of: location information according to a determination that an opt-in input has been detected from a user of the electronic device, or historical usage information according to a determination that an opt-in input has been detected from a user of the electronic device.

24. The non-transitory memory of claim 20, wherein each of the plurality of candidate content placement locations satisfies a content placement criterion.

25. The non-transitory memory of claim 24, wherein the content placement criterion is satisfied when at least one of: a candidate content placement location satisfies dimensional parameters or a candidate content placement location corresponds to a planar surface.

26. The non-transitory memory of claim 24, wherein the content placement criterion is not satisfied when at least one of: a candidate content placement location is associated with rotational motion or a candidate content placement location is associated with translational motion greater than a threshold velocity.

* * * * *